United States Patent [19]

Peterson et al.

[11] Patent Number: 5,065,040

[45] Date of Patent: Nov. 12, 1991

[54] REVERSE FLOW NEURON

[75] Inventors: William M. Peterson, Scottsdale; Robert H. Leivian, Chandler; Sidney C. Garrison, III, Tempe, all of Ariz.

[73] Assignee: Motorola Inc., Schaumburg, Ill.

[21] Appl. No.: 562,169

[22] Filed: Aug. 3, 1990

[51] Int. Cl.[5] .............................................. G06F 15/42
[52] U.S. Cl. .................................... 307/201; 307/243; 395/24
[58] Field of Search ............... 307/201, 242, 353, 243; 364/513, 807, 822

[56] References Cited

U.S. PATENT DOCUMENTS

| | | | |
|---|---|---|---|
| 4,873,455 | 10/1989 | de Chambost et al. | 307/201 |
| 4,874,963 | 10/1989 | Alspector | 307/201 |
| 4,875,183 | 10/1989 | Graf et al. | 307/201 X |
| 4,893,255 | 1/1990 | Tomlinson, Jr. | 364/513 |
| 4,908,751 | 3/1990 | Smith | 364/513 X |
| 4,989,256 | 1/1991 | Buckley | 364/513 X |
| 5,004,309 | 4/1991 | Caulfield et al. | 364/822 X |

Primary Examiner—David Hudspeth
Attorney, Agent, or Firm—Robert D. Atkins

[57] ABSTRACT

A neural network is provided for performing bi-directional signal transformations through a matrix of synapses by alternately sending and receiving signal vectors therethrough via switchable driver circuits. In the forward direction, the input signal is transformed according to the weighting elements of the synapses for providing an output signal. The drive direction of the switchable driver circuits may be reversed allowing the output signal to flow back through the same synapses thereby performing a reverse transformation, which may actually be an improved estimate of the original input signal. Sample and hold circuits are provided for latching the output signals of the switchable driver circuits back to the inputs thereof for repeated forward and reverse signal transformations until an acceptable transformation of the original input signal is realized, thereby achieving an improved estimate of the input signal and corresponding output transformation. More generally, a first input signal may be transformed in one direction through the synapses, while a second input signal, possibly independent and unrelated to the first input signal, may be reverse transformed in the opposite direction using the same synapses as the first direction.

14 Claims, 7 Drawing Sheets

REVERSE FLOW NEURON

BACKGROUND OF THE INVENTION

The present invention relates in general to neural networks and, more particularly, to a neural network for providing bi-directional signal transformation through the synapses of the neural network.

A biological neuron is a single nerve cell responsive to stimuli through weighted inputs known as synapses. The weighted stimuli are summed and processed through a particular non-linearity (sigmoid) associated with the neuron. The output of the neuron may be connected to the synapses of other neurons forming an interconnection known as a neural network which possesses many desirable properties including the ability to learn and recognize information patterns in a parallel manner.

One common implementation of the neural network is known as a Kohonen feature map comprising a matrix of neurons interconnected between a plurality of inputs and a plurality of outputs, wherein a spatial vector of an input signal applied at the inputs undergoes a forward signal transformation according to the values of the synapses (weights) and sigmoid functions of the neurons for providing an output spatial vector at the outputs. It is often desirable to perform bi-directional signal transformations, possibly to correct or improve an erroneous input signal. For example, given only a partial vector of the input signal applied at the inputs, possibly from the corruption of the original input signal in the presence of noise, the resulting spatial vector of the output signal may initially be a poor representation of the transformation of the original input signal. However, the output signal may be reverse transformed through a similar second feature map and re-applied to the inputs of the first feature map for obtaining a better estimate of the original input signal. The estimate of the input signal may be reprocessed in the forward direction through the first feature map and again reverse transformed through the second feature map for an even better estimate. The cycles may continue until an acceptable transformation of the original input signal is realized, or until no further improvement appears.

When performing the forward and reverse signal transformations, most if not all neural networks utilize two similar neural structures with separate drive and control circuitry. This approach not only requires a duplication of the neural network, but also a close matching between the corresponding synapses of the forward and reverse transformation neural networks. Any discrepancies in the synapse matching may easily lead to errors in the signal transformations thereby defeating the effort to provide a better estimate of the input signal. Moreover, the physical form of the neural networks is often quite large, especially the synapses and associated conductors and control circuitry, occupying a major portion of the available space. Hence, maintaining two neural networks is inefficient. A more desirable approach would be to allow bi-directional transmission through a single neural network, whereby only one matrix of synapses is used for the forward and reverse signal transformations.

Hence, there is a need for an improved neural network allowing bi-directional transmission through a matrix of synapses while using the same weighting elements and associated circuitry for the forward and reverse signal transformations for providing a more efficient utilization of the neural network.

SUMMARY OF THE INVENTION

Accordingly, an objective of the present invention is to advance the art of neural networks.

A further objective of the present invention is to provide a neural network including a matrix of synapses allowing bi-directional transmission therethrough.

Another objective of the present invention is to provide an improved neural network having switchable driver circuits for sending and receiving signal vectors through the matrix of bi-directional synapses.

Yet another objective of the present invention is to provide an improved neural network including sample and hold circuits coupled for latching the output signals of the switchable driver circuits back to the inputs of the same for providing repeated forward and reverse signal transformations while achieving an improved estimate of the input signal and corresponding output transformation.

In accordance with the above and other objectives there is provided a neural network having a first plurality of inputs coupled for receiving a spatial vector of an input signal for providing a transformation thereof at a first plurality of outputs. A plurality of weighting elements are interconnected between the first plurality of conductors and the second plurality of conductors in a predetermined manner, while a first plurality of switchable driver circuits are respectively coupled between the first plurality of inputs and the first plurality of conductors. The first plurality of switchable driver circuits operate to drive the first plurality of conductors at the occurrence of a first state of a first switch control signal while receiving signals from the first plurality of conductors at the occurrence of a second state of the first switch control signal. Similarly, a second plurality of switchable driver circuits are respectively coupled between the first plurality of outputs and the second plurality of conductors. The second plurality of switchable driver circuits receive signals from the second plurality of conductors at the occurrence of the first state of a second switch control signal while driving the second plurality of conductors at the occurrence of the second state of the second switch control signal.

In another aspect the present invention is a method of performing forward and reverse signal transformations through the weighting elements of a network. A first input signal is transformed in the forward direction through the weighting elements of the network for obtaining a first output signal. The drive direction through the weighting elements of the network is reversed allowing a second input signal to be transformed in the reverse direction through the weighting elements of the network for obtaining a second output signal.

DETAILED DESCRIPTION OF THE PREFERRED EMBODIMENT

Figure 1:
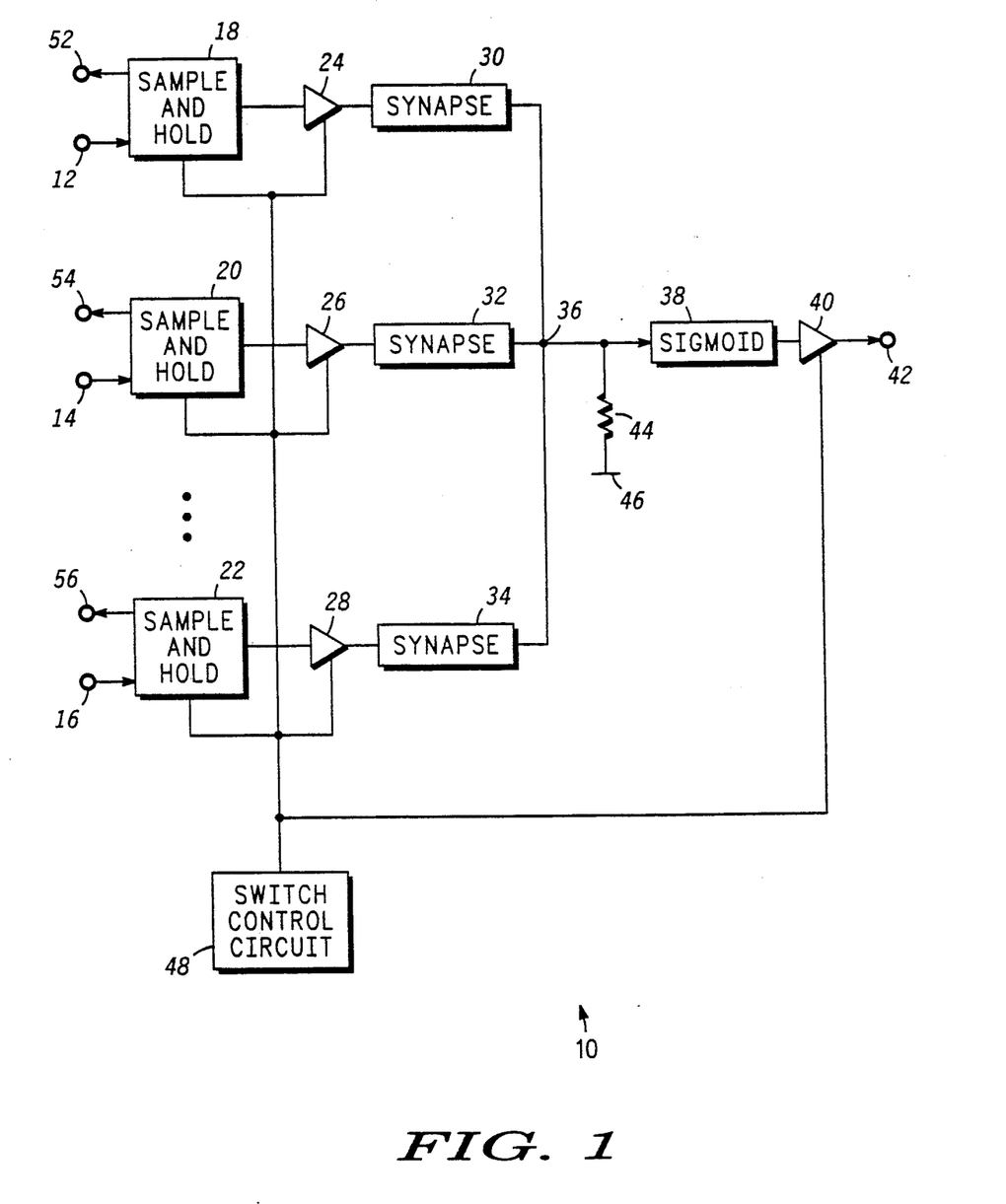
FIGS. 1 and 2 are simplified block diagrams illustrating the preferred embodiment of a single neuron representation of the present invention.

An electronic neuron 10 is shown in FIG. 1 suitable for manufacturing in integrated circuit form using conventional integrated circuit processes. A spatial vector of an input signal derived from say an analog input signal sampled through delay circuits (not shown) at progressively earlier instances in time is applied at terminals 12, 14 and 16. For example, assuming constant and equal delays of "$t_d$" seconds, the spatial vector of the analog input signal, $V_{in}$, applied at terminals 12, 14 and 16 may be $V_{in}(t_0-t_d)$, $V_{in}(t_0-2t_d)$ and $V_{in}(t_0-3t_d)$, respectively, where $V_{in}(t_0)$ is the non-delayed time value thereof. It is understood that the input signal may also take the form a serially coded digital signal or an optical signal. The length of the spatial vector is typically made much longer in practice, say 20 or more elements, with additional delay circuits thereby increasing the number of samples of the input signal. The time delay $t_d$ may be selected at 10 microseconds for processing analog signals operating at a maximum frequency of 20 KHz in audio applications.

The spatial vector of the input signal, hereinafter simply referred to as the input signal, is applied through sample and hold circuits 18, 20 and 22 and driver circuits 24, 26 and 28 to synapses 30, 32 and 34, respectively. The input signal is weighted through synapses 30, 32 and 34, that is, each may be attenuated, amplified or even passed without modification according to the values thereof, and accumulated by summing node 36 and processed in the forward direction through a particular non-linearity associated with sigmoid 38 for providing an output signal which is buffered through driver circuit 40 and applied at terminal 42. In addition, resistor 44 is coupled between summing node 36 and power supply conductor 46 typically operating a ground potential for converting the current flowing from summing node 36 into a voltage at the input of sigmoid 38, while sample and hold circuits 18-22 and driver circuits 24-28 and 40 are responsive to switch control circuit 48 for controlling the operation thereof. Thus, the input signal applied at terminals 12-16 undergoes a forward signal transformation through synapses 30-34 and sigmoid 38 for providing an output signal at terminal 42, $V_{42}$, as follows:

$$V_{42} = \sigma(W_{30}V_{in}(t_0-t_d) + W_{32}V_{in}(t_0-2t_d) + W_{34}V_{in}(t_0-3t_d)) \quad (1)$$

where:

$\sigma()$ is the nonlinear transfer function of sigmoid 38
$W_{30}$ is the weight of synapse 30
$W_{32}$ is the weight of synapse 32
$W_{34}$ is the weight of synapse 34.

Figure 2:
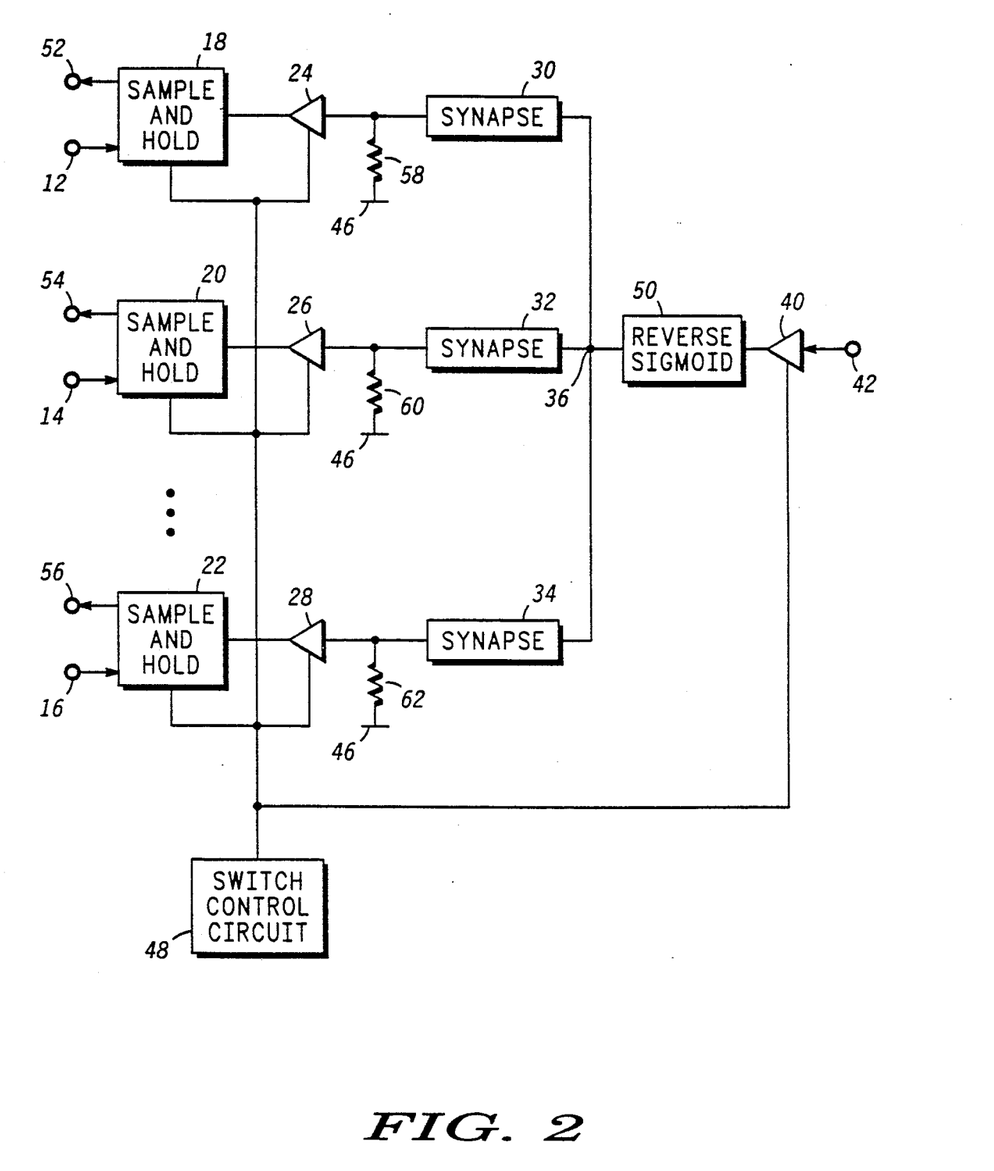

Conventional neurons are typically uni-directional devices in that the input signal may only flow from the input, through the synapses, summing node and sigmoid and out. In order to perform the aforedescribed reverse transformation through the neuron, it has been necessary in the prior art to duplicate most if not all of the neural structure. A more effective approach is shown in FIG. 2, wherein driver circuits 24-28 and 40 are reversible (the drive direction may be complemented) under control of switch control circuit 48 for providing a reverse flow feature. FIG. 2 is a re-illustration of FIG. 1 showing driver circuits 24-38 and 40 oriented in the opposite direction, otherwise, components having a similar function are given the same reference number as used in FIG. 1. An input signal may be applied at terminal 42 and processed through reverse sigmoid 50 and synapses 30-34. Reverse sigmoid 50 performs the inverse operation of sigmoid 32, while driver circuits 24-28 buffer the reverse transformed signal through sample and hold circuits 18-22 to terminals 52, 54 and 56, respectively. Resistors 58, 60 and 62 are coupled between the inputs of driver circuits 24-28 and power supply conductor 46 for developing operative voltages at the respective inputs. Thus, the signal applied at terminal 42 is reverse transformed through neuron 10 utilizing the same synapses 30-34 and associated conductors and drive circuitry. Another feature of sample and hold circuits 18-22 allows the output signals of driver circuits 24-28 to be sampled under control of switch control circuit 48 and reapplied to the inputs thereof. The drive direction of driver circuits 24-28 is again switched leaving each oriented as shown in FIG. 1 allowing the reverse transformed signal to be reprocessed back through neuron 10 in the forward direction.

To form a complete neural network, say a two dimensional feature map, additional synapses (not shown) would be coupled to the inputs of reversible driver circuits 24-28 each processing a portion of the reverse transformed signal vector. In reverse direction, synapses 30-34 actually become integral components of three reverse flow neurons, that is, the synapses are shared between neurons depending upon the direction of signal transmission, i.e., in row order for one direction and column order for the reverse direction. Further discussion on multi-dimensional neural networks is forthcoming.

Figure 3:
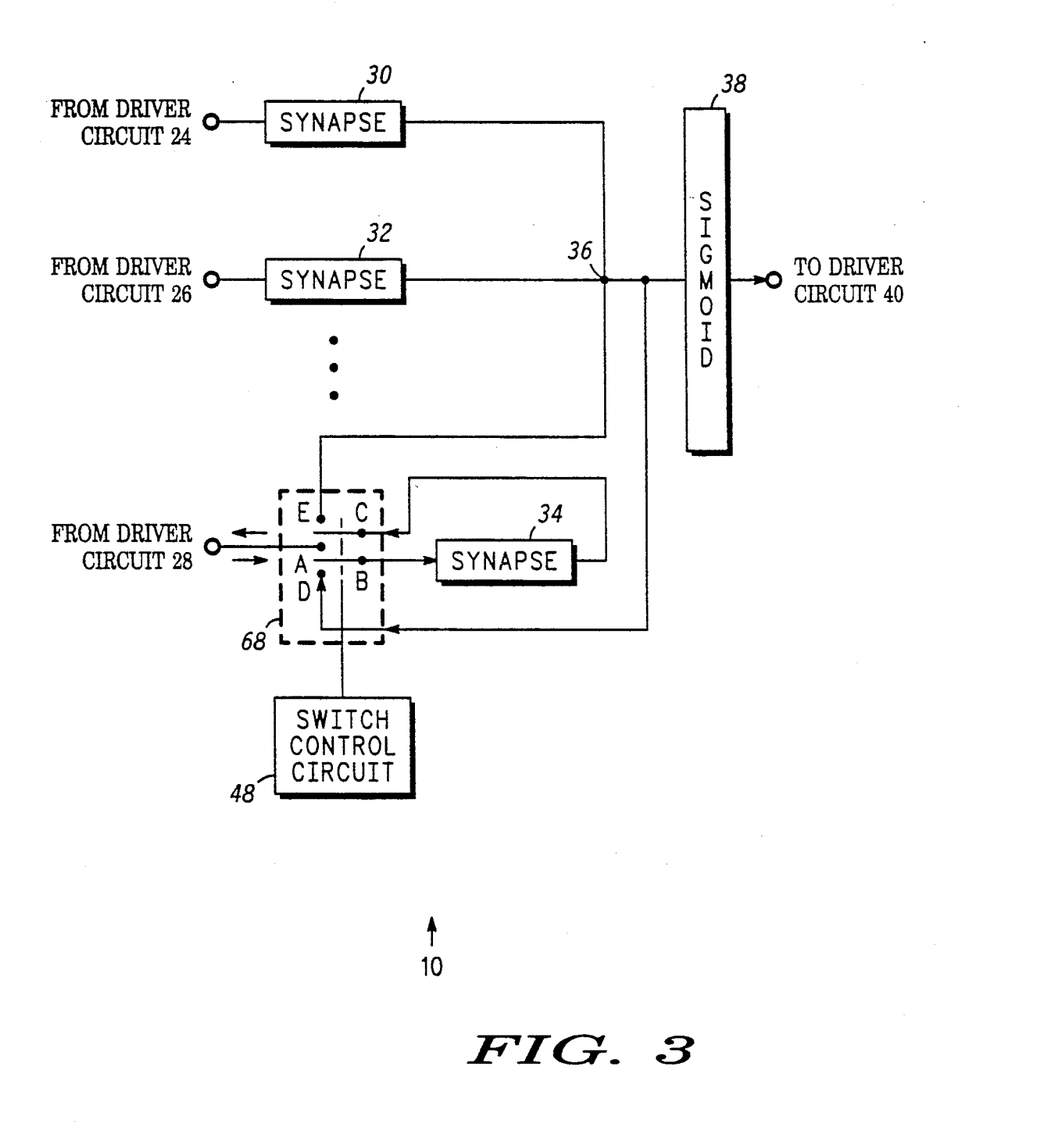
FIG. 3 is a simplified block diagram illustrating bi-directional operation for a naturally uni-directional synapse.

The forward and reverse signal transformations necessitate the ability to process in either direction through synapses 30-34. For a synapse inherently capable of bi-directional conduction, such as a resistor, the embodiment of FIGS. 1 and 2 is operative; however, some synapses are naturally uni-directional devices, such as a MOS transistor or a ROM (read only memory). Accordingly, neuron 10 of FIG. 3 includes switching circuit 68 for providing bi-directional transmission through a uni-directional synapse, that is, the input signal may be applied at either terminal 16 or terminal 42 and processed through neuron 10. Again, components having a similar function are given the same reference number as used in FIG. 1. Switching circuit 68 comprises terminal A coupled to driver circuit 28, terminals B and C coupled to the input and output of synapse 34, respectively, and terminals D and E coupled to summing node 36. A switch control signal provided at the output of switch control circuit 48 controls the contact closure of switching circuit 68. For example, in response to a first state of the switch control signal, terminal A of switching circuit 68 is brought in contact with terminal B while terminal C is connected to terminal E. The first state of the switch control signal also orients driver circuits 24–28 and 40 as shown in FIG. 1. The input signal applied at terminal A of switching circuit 68 is thus processed in the forward direction through terminal B, synapse 34, terminals C and E, summing node 36 and sigmoid 38 and out to driver circuit 40, respectively. Alternately, a second state of the switch control signal orients driver circuits 24–28 and 40 as shown in FIG. 2 and connects terminal A of switching circuit 68 to terminal C and connects terminal D to terminal B, whereby the signal received from driver circuit 40 is reverse transformed through reverse sigmoid 50 and routed to terminals D and B of switching circuit 68, through synapse 34 and out terminals C and A to driver circuit 28. Thus, one important feature of FIG. 3 is the dual use of synapse 34 and the conductors associated therewith, wherein switching circuit 68 provides forward signal transmission through neuron 10 at the occurrence of the first state of the switch control signal, while the second state of the switch control signal enables the reverse signal transmission therethrough. Additional switching circuits like 68 may be coupled between driver circuits 24 and 26 and synapse 30 and 32, respectively, for performing a similar function.

Figure 4:
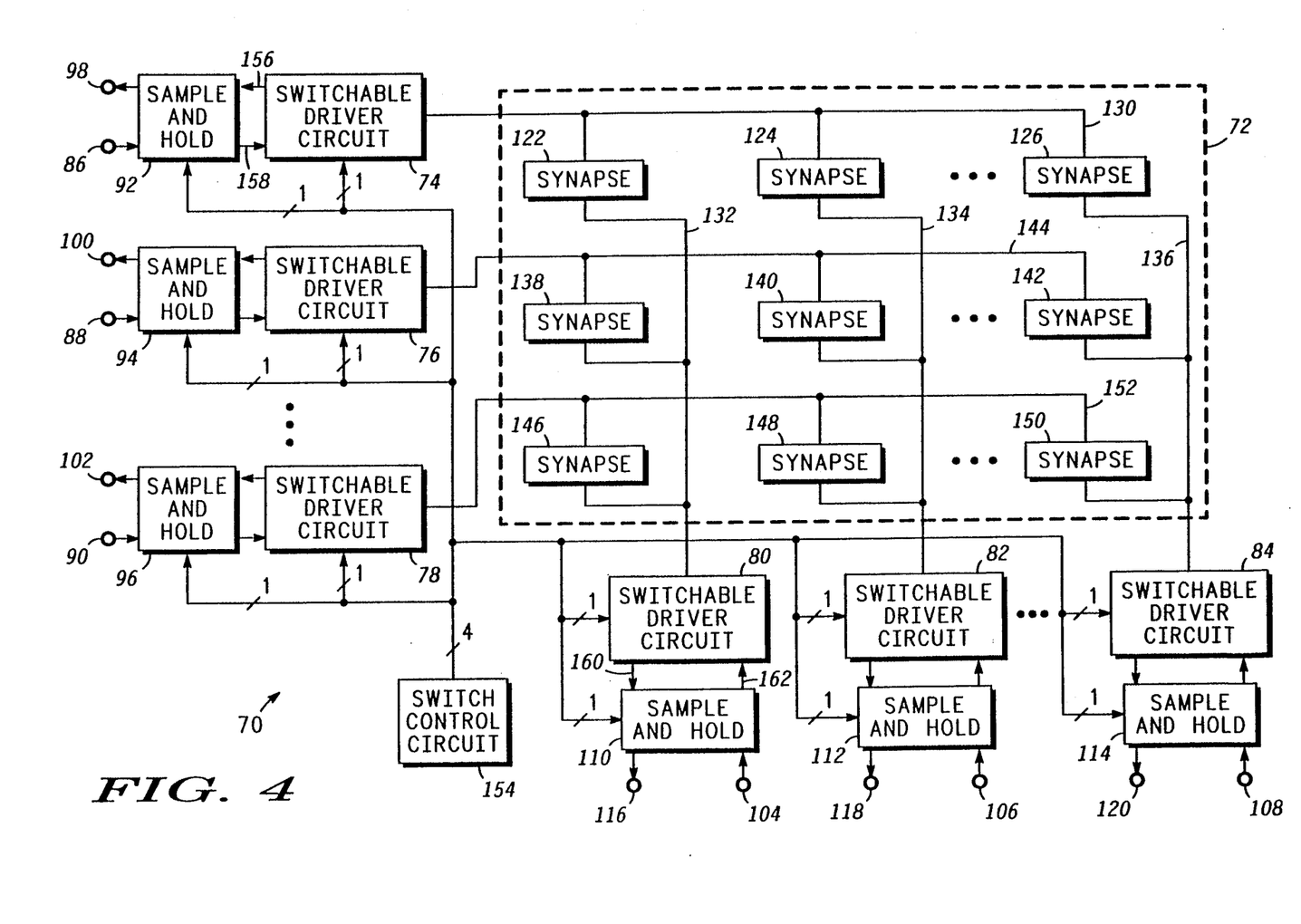
FIG. 4 is a simplified block diagram illustrating the preferred embodiment of a multiple neuron representation of the present invention.

Referring to FIG. 4, there is shown neural network 70 as a two dimensional extension of neuron 10 also suitable for manufacturing in integrated circuit form using conventional integrated circuit processes. Neural network 70 includes weighting matrix 72 coupled between switchable driver circuits 74, 76, and 78 and switchable driver circuits 80, 82, and 84. The inputs of switchable driver circuits 74–78 are provided via terminals 86, 88, and 90 through sample and hold circuits 92, 94 and 96, respectively, while the outputs of switchable driver circuits 74–78 are also coupled through sample and hold circuits 92–96 to terminals 98, 100 and 102. Likewise, the inputs of switchable driver circuits 80, 82 and 84 are provided at terminals 104, 106 and 108 through sample and hold circuits 110, 112 and 114, respectively, while the outputs of switchable driver circuits 80–84 are coupled to terminals 116, 118 and 120. The implementation of sample and hold circuits 92–96 and 110–114 is believed to be well enough known in the art with the functional description provided herein. Weighting matrix 72 comprises a matrix of synapses operating as weighting elements including synapses 122, 124 and 126 coupled between switchable driver circuit 74 by conductor 130 and switchable driver circuits 80–84 through conductors 132, 134 and 136, respectively, while synapses 138, 140 and 142 are coupled between switchable driver circuit 76 by way of conductor 144 and switchable driver circuits 80–84 through conductors 132–136, and synapses 146, 148 and 150 are coupled between switchable driver circuit 78 via conductor 152 and switchable driver circuits 80–84 also through conductors 132–136. In relating FIG. 4 to FIGS. 1–3, the summing operation for synapses 122–150 is performing along conductors 130, 132, 134, 136, 144 and 152, while the sigmoids (not shown) may be coupled in conductors 132, 134 and 136 between weighting matrix 72 and switchable driver circuits 80–84. Alternately, the sigmoid functions may be performed within the individual synapses, as is well known in the neural network art.

The matrix of synapses 122–150 of weighting matrix 72 may be the adaptive or non-adaptive variety. For the initial explanation, synapses 122–150 are taken as non-adaptive weights, for example resistors, the values of which are selected for performing a predetermined transformation of the input signal. Thus, the output signal of switchable driver circuit 74 applied at conductor 130 is weighted through synapses 122–126 and flows through conductors 132–136, respectively. The weighting occurs for example as the voltage developed across synapse 122 ($V_{122}$) induces a current ($I_{122}$) to flow through the resistive element thereof ($R_{122}$) into conductor 132, i.e., $V_{122}*1/R_{122}=I_{122}$, thus, the weight of synapse 122 is proportional to $1/R_{122}$. Likewise, the output signal of switchable driver circuit 76 applied at conductor 144 is weighted through synapses 138–142 and combined with the output signals of synapses 122–126 flowing through conductors 132–136 (summing action), respectively, while the output signal of switchable driver circuit 78 applied at conductor 152 is weighted through synapses 146–150 and combined with the signals flowing in conductors 132–136. In other words, the output signals of switchable driver circuits 74–78 are multiplied by the weights of synapses 122, 138 and 146, respectively, and applied to switchable driver circuit 80 via conductor 132, and the output signals of switchable driver circuits 74–78 are also multiplied by the weights of synapses 124, 140 and 148 and applied to switchable driver circuit 82 via conductor 134, while the output signals of the same are multiplied by the weights of synapses 126, 142 and 150 and applied to switchable driver circuit 84 via conductor 136. Switchable driver circuits 80–84 receive the signals from conductors 132–136 and drive terminals 116–120 through sample and hold circuits 110–114, respectively, thereby providing an output signal according to the predetermined transformation of the input signal through weighting matrix 72.

Switch control circuit 154 provides first, second, third and fourth switch control signals for controlling the operation of switchable driver circuits 74–78, switchable driver circuits 80–84, sample and hold circuits 92–96 and sample and hold circuits 110–114, respectively. The first state of the first switch control signal enables switchable driver circuits 74–78 to receive input signals from terminals 86, 88 and 90 and drive conductors 130, 144 and 152, respectively, while the first state of the second switch control signal orients switchable driver circuits 80–84 to receive signals from conductors 132–136 and drive terminals 116–120 through sample and hold circuits 110–114, thereby defining the forward transmission path. The first state of the third switch control signal applied at sample and hold circuits 92–96 enables conduction paths from terminals 86–90 through sample and hold circuits 92–96, respectively, while isolating the respective inputs, such as node 156, and outputs, like node 158, of switchable driver circuits 74–78.

Conversely, the second state of the first and second switch control signals reverses the transmission path through synapses 122–150 by complementing the drive direction of switchable driver circuits 74–78 and 80–84, whereby the latter receive signals from terminals 104–108 and drive conductors 132–136, respectively, while switchable driver circuits 74–78 are configured for receiving signals from conductors 130, 144 and 152 and driving terminals 98–102 through sample and hold circuits 92–96. The transition to the second state of the third switch control signal causes sample and hold circuits 92-96 to sample the output signals of switchable driver circuits 74-78, for example node 156, and apply the sample to the inputs of the same, like node 158, while isolating terminals 86-90 from the inputs of switchable driver circuits 74-78, respectively. Thus, a bi-directional path is provided through neural network 70 allowing the reverse transformation of the signal processed from switchable driver circuits 80-84, through synapses 122-150 and out switchable driver circuits 74-78 to be re-applied to the forward transmission path. The fourth switch control signal controls sample and hold circuits 80-84 in a similar manner as described for the third switch control signal and sample and hold circuits 74-78. The implementation of switch control circuit 154 is believed to be well known to one of ordinary skill in the art, for example as combination logic circuit, for providing the switching control given the aforedescribed operation.

One beneficial property of artificial neural networks is the ability to extract a clean output signal, or at least a good estimate thereof, even though the input signal is incomplete or corrupted. Consider the example of improving a corrupt input signal wherein only a partial spatial vector of the input signal is applied at terminals 86-90. Accordingly, the first, second, third and fourth switch control signals are placed in the first state for performing a forward transformation of the input signal and providing an output signal at terminals 116-120. The forward signal transformation may be viewed as the matrix multiplication of the spatial vector of the input signal applied at terminals 86-90, $\bar{v}$, and the matrix of synapses 122-150, M, yielding the output signal vector, $\bar{y}$, i.e., $M\bar{v} = \bar{y}$, where the components of the output signal vector $\bar{y}$ are the currents flowing through conductors 132, 134 and 136.

Following the first forward signal transformation, the third switch control signal transitions to the second state whereby sample and hold circuits 110-114 sample the output of switchable driver circuits 80-84, such as node 160, and apply the sample back to the input of the same, like node 162. The first and second switch control signals then change to the second state whereby the drive direction of switchable driver circuits 74, 76, 78, 80, 82 and 84 are reversed, that is, switchable driver circuits 80-84 now drive conductors 132-136 while switchable driver circuits 74-78 receive from conductors 130, 144 and 152. The output signal re-applied at the inputs of switchable driver circuits 80-84 is thus reverse transformed through synapses 122-150 and appears at terminals 98-102. In a similar manner, the reverse signal transformation may be viewed as the matrix multiplication of the spatial vector of the output signal, $\bar{y}$, and the transpose of the matrix of synapses 122-150, $M^T$, yielding the new input signal vector, $\bar{v}'$, i.e., $M^T\bar{y} = \bar{v}'$. The fourth switch control signal may be placed in the second state allowing sample and hold circuits 92-96 to sample the output of switchable driver circuits 74-78, such as node 156, and apply the sample back to the input of the same, like node 158, thus becoming an input signal thereto. This new application of the input signal is actually an improved estimate of the original corrupted input signal. Another important observation is that the reverse transformation was accomplished through the same matrix of synapses 122-150 and conductors 130-136, 144 and 152 used in the forward signal transformation path.

The first and second switch control signals now return to the first state driving the new estimate of the input signal, $\bar{v}'$, forward through neural network 70, after which the output of switchable driver circuits 80-84 is again sampled. The first and second switch control signals change back to the second state for performing another reverse signal transformation and providing an even better estimate of the input signal at the inputs of switchable driver circuits 74-78 thereby completing two forward and reverse signal transformation cycles. The process may continue, say three or four iterations, until the desired resolution is achieved, or until no further improvements in the input signal are observed, whereafter the transformed output signal proceeds with improved recognition to the next level of processing (not shown) via terminals 116-120, or the improved input signal may be utilized at terminals 98-102. For instance, the current input signal could be shifted one delay time $t_d$, then one forward and reverse transformation cycle would produce a prediction of the next input signal.

Notably, synapses 122-150 are shared between forward and reverse flow neurons. For example, in the forward direction one neuron may comprise synapses 122, 138 and 146 summed into conductor 132, while a reverse flow neuron includes synapses 122, 124 and 126 feeding conductor 130. Thus, synapses 122 is actually shared between two neurons.

For another application, a first input signal may be applied to terminals 86-90 and transformed in one direction through synapses 122-150 for providing a first output signal at terminals 116-120. After the drive direction of switchable driver circuits 74-78 and 80-84 are reversed, a second input signal possibly unrelated to the first input signal may be applied at terminals 104-108 and transformed in the opposite direction for providing a second output signal at terminals 98-102 although using the same synapses 122-150 and associated conductors 130-136, 144 and 152 as the first direction. Thus, it should be appreciated by now that bi-directional neural network 70 provides improved efficiency over uni-directional neural networks.

Figure 5:
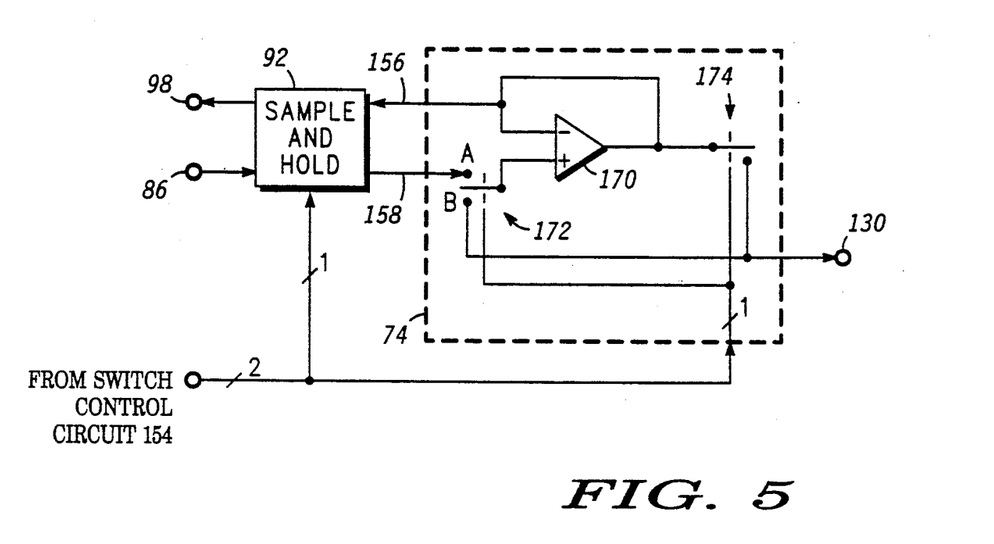
FIG. 5 is a simplified schematic and block diagram illustrating one implementation of a switchable driver circuit.

Turning to FIG. 5, there is shown one embodiment of switchable driver circuit 74 including operational amplifier 170 having a non-inverting input coupled through terminal A of switching circuit 172 and through sample and hold circuit 92 to terminal 86, and an inverting terminal also coupled through sample and hold circuit 92 to terminal 98. The output of operational amplifier 170 is coupled through switching circuit 174 to conductor 130, while terminal B of switching circuit 172 is also coupled to conductor 130. The control inputs of switching circuits 172 and 174 are responsive to switch control circuit 154 for controlling the operation thereof, wherein the first state of the first switch control signal connects terminal A of switching circuit 172 to the non-inverting input of operational amplifier 170, while the output of operational amplifier 170 is connected to conductor 130. The second state of the first switch control signal connects the non-inverting input of operational amplifier 170 to conductor 130 via terminal B and open-circuits switching circuit 174. Thus, with the first switch control signal in the first state, operational amplifier 170 is configured as a voltage follower and drives conductor 130 with the signal applied at terminal A of switching circuit 172. The second state of the first switch control signal opens the output drive upon conductor 130 and allows the signal flowing through the latter to drive terminal 98 through operational amplifier 170 via terminal B of switching circuit 172. Again, the first state of the third switch control signal enables the input signal applied at terminal 86 to propagate through to terminal A of switching circuit 172, while the second state samples the output signal of switchable driver circuit 74 at node 156 and holds the improved estimate of the input signal at the input of the same, that is node 158, for re-transmission along conductor 130 and through neural network 70.

Figure 6:
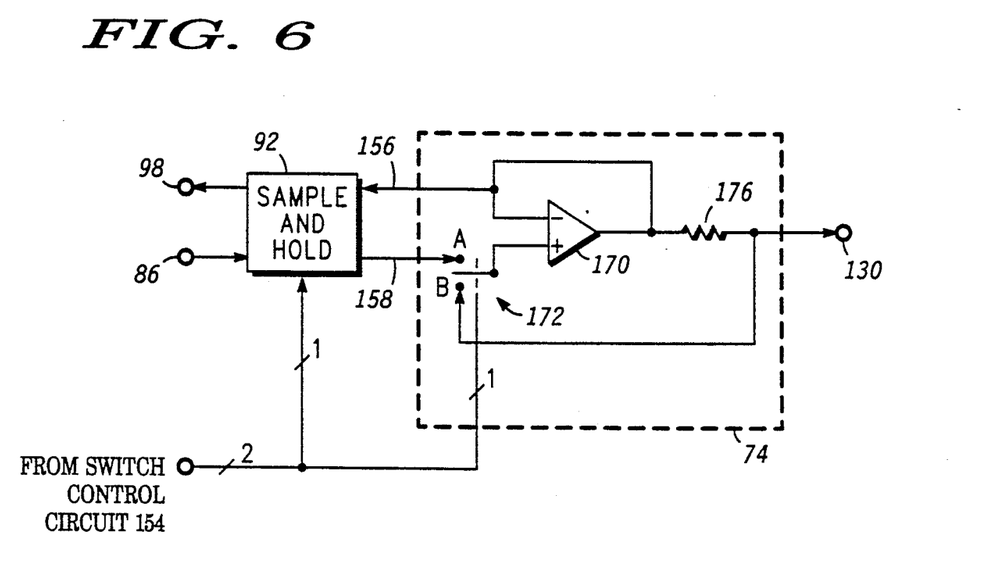
FIG. 6 is a simplified schematic and block diagram illustrating an alternate implementation of the switchable driver circuit.

An alternate embodiment of switchable driver circuit 74 is shown in FIG. 6. Components having a similar function are given the same reference number as used in FIG. 5 with the exception of resistor 176 which simplifies the construction of switchable driver circuit 74 by replacing switching circuit 174 and provides a means of monitoring the convergence of the aforedescribed iterations of finding the best estimate of the corrupted input signal. As the input signal applied at terminal A of switching circuit 172 (also appearing at the output of operational amplifier 170 as a voltage follower) approaches the reverse transformation returning from synapses 122-126 through conductor 130, the potential across resistor 176 approaches zero. That is, the next estimate is substantially equal to the previous estimate and further iterations will not provide any better approximations thereof. The transformation cycles may be discontinued upon detecting substantially zero potential across resistor 176. The implementation of switchable driver circuits 76, 78, 80, 82, and 84 may follow either pattern described in FIG. 5 and FIG. 6.

Figure 7:
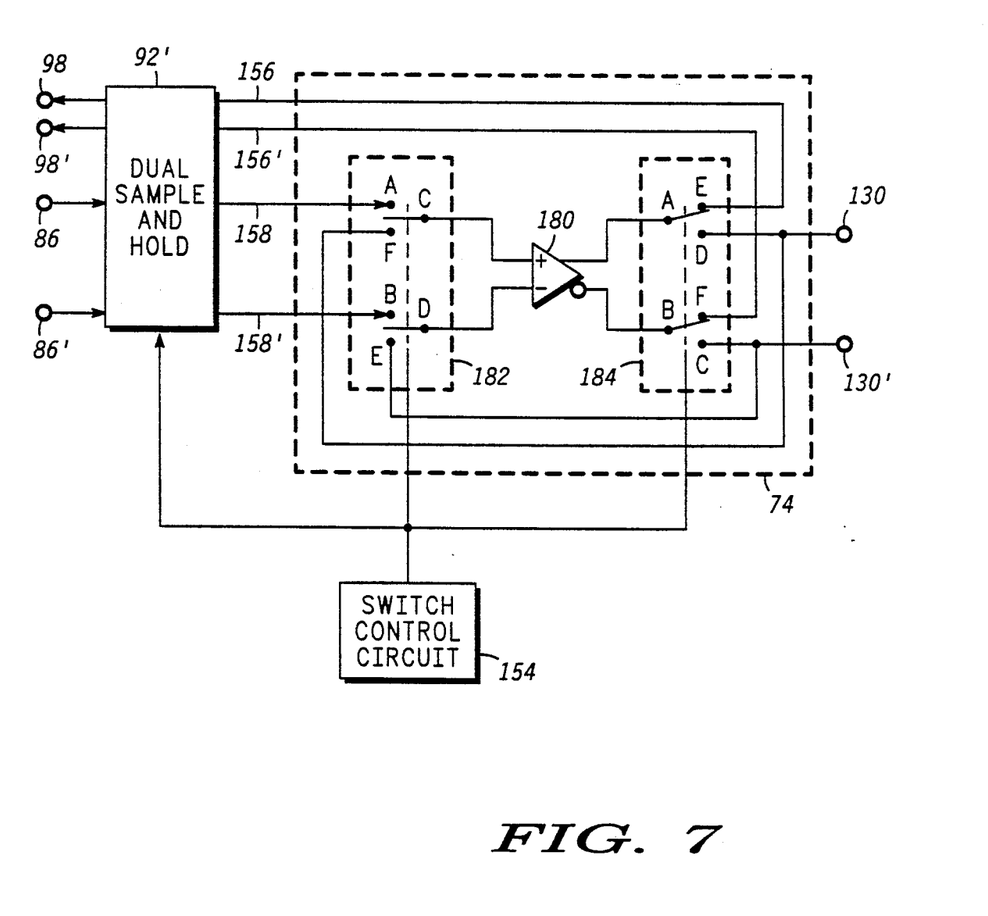
FIG. 7 is a simplified schematic and block diagram illustrating a switchable driver circuit having inverting and non-inverting outputs.

Often it is necessary to assign a negative value to one or more of synapses 122-150. A common procedure for providing negative value synapses is shown in FIG. 7 wherein switchable driver circuit 74 includes operational amplifier 180 having inverting and non-inverting inputs coupled through switching circuit 182 to dual sample and hold circuit 92' and non-inverting and inverting outputs coupled through switching circuit 184 to conductors 130 and 130'. Terminal pairs 86 and 86', 98 and 98', 130 and 130', 156 and 156', and 158 and 158' each conduct differential signals. Dual sample and hold circuit 92' is coupled between terminals 86 and 86' and terminals 98 and 98' and the inputs (nodes 158 and 158') and outputs (nodes 156 and 156') of switchable driver circuit 74 and operates as two sample and hold circuits for the differential signal appearing at nodes 156 and 156' under control of the fourth switch signal of switch control circuit 154. Node 158 is coupled to terminal A of switching circuit 182, and node 158' is coupled to terminal B, while terminals C and D are coupled to the non-inverting and inverting inputs of operational amplifier 180, respectively. In addition, terminals E and F of switching circuit 182 are coupled to conductors 130' and 130, respectively. The non-inverting and inverting outputs of operational amplifier 180 are coupled to terminals A and B of switching circuit 184, and terminals C and D are coupled to conductors 130' and 130, while terminals E and F of the same are coupled to nodes 156 and 156'. The first state of the first switch control signal connects terminal A to terminal C and terminal B to terminal D of switching circuit 182, and terminal A to terminal D and terminal B to terminal C of switching circuit 184 for the forward signal transformation. Alternately, the second state of the first switch control signal connects terminal F to terminal C and terminal E to terminal D of switching circuit 182, and terminal A to terminal E and terminal B to terminal F of switching circuit 184 for the reverse signal transformation. Thus, to assign a particular polarity, one need only connect for example synapse 122 to conductor 130 for positive values and conductor 130' for negative values.

In a similar manner, the operational amplifiers of switchable driver circuits 76-84 may also include non-inverting and inverting outputs thus creating a four conductor intersection at each synapse. In the present example, it is logical to connect each terminal of the synapse to the same polarity of output of the opposite switchable driver circuit for providing complementary forward and reverse transformations; however, it may be desirable in other applications to provided positive synapses in one direction and negative synapses in the other direction. A further extension of the present invention (not shown) is to duplicate each switchable driver circuit 74-84 in pairs with one of each pair responsible for driving the opposing polarity. For example, one operational amplifier of the pair could drive conductor 130 from its non-inverting output while the other operational amplifier drives conductor 130' from its inverting output. Four synapses of similar and/or different values could then be connected one each between the four-conductor intersections thereby allowing the four processing channels to be active simultaneously. Such an arrangement, and even further extensions thereof, could provide numerous complex and useful capabilities for neural network 70.

Figure 8:
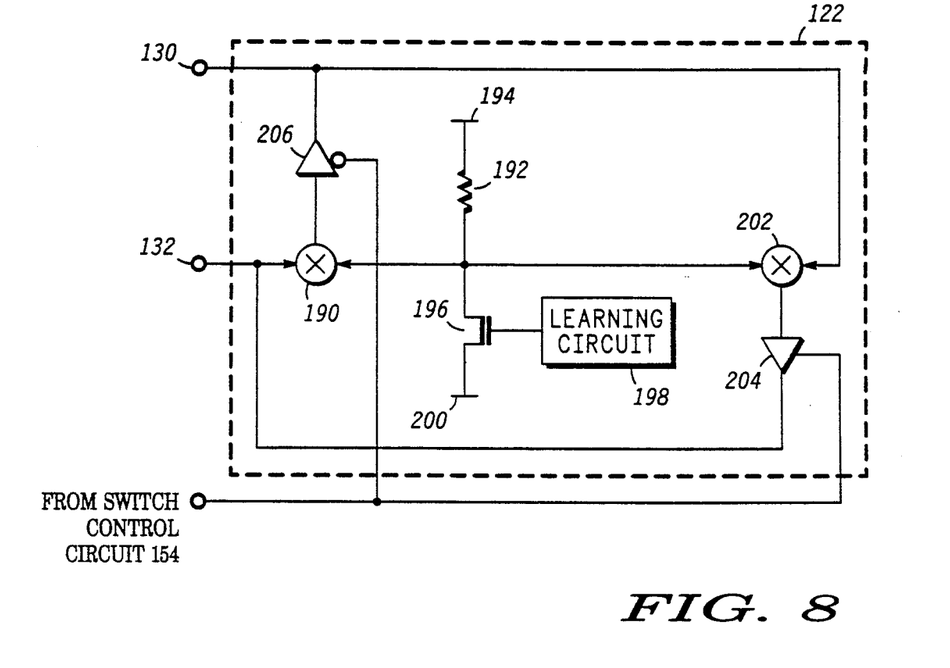
FIG. 8 is a simplified block diagram illustrating one implementation of a bi-directional adaptive synapse.

As stated, synapses 122-150 may be implemented in adaptive or non-adaptive form, the latter form having been considered thusfar as a resistor. Since the weighting of non-adaptive synapses are not adjustable, any modification to the neural transformation through weighting matrix 72 tends to be inflexible, leading to a justification for the more complex adaptive synapses, one of which is shown in FIG. 8 as synapse 122 including multiplier 190 having a first input coupled to conductor 132 and a second input coupled through resistor 192 to power supply conductor 194, typically operating at a positive potential. The second input of multiplier 190 is also coupled to the drain of transistor 196 which includes a gate coupled to learning circuit 198 and a source coupled to power supply conductor 200 operating at ground potential. The drain of transistor 196 is coupled to the first input of multiplier 202, the output of which is coupled through tri-state buffer 204 back to conductor 132. The output of multiplier 190 is coupled through tri-state buffer 206, the output of which feeds conductor 130 and the second input of multiplier 202. The outputs of tri-state buffers 204 and 206 are assumed to be current sources. Furthermore, multipliers 190 and 202 may be implemented as the well known Gilbert multiplier circuits.

Learning circuit 198 provides an adjustable reference signal for establishing the weight of synapse 122, that is, the output signal of learning circuit 198 determines the current flowing through resistor 192 and transistor 196 thereby developing a potential at the second inputs of multipliers 190 and 202 corresponding to the weight of synapse 122. Tri-state buffers 204 and 206 are responsive to the first switch control signal supplied by switch control circuit 154 and operate in a complementary manner wherein one conducts while the other is tri-stated. For example, if switchable driver circuit 74 is driving conductor 130 (first state of first switch control signal enabling the forward transmission path), buffer 206 is tri-stated and buffer 204 conducts. The signal applied at the first input of multiplier 202 is thus multiplied by the weight developed at the second input of the same and the resulting output signal flows through buffer 204 into conductor 132. Alternately, if switchable driver circuit 80 is driving conductor 132 (first state of second switch control signal enabling the reverse transmission path), buffer 204 is tri-stated and buffer 206 conducts. The signal applied at the first input of multiplier 190 is multiplied by the weight developed at the second input of the same and the resulting output signal flows through buffer 206 into conductor 130.

Figure 9:
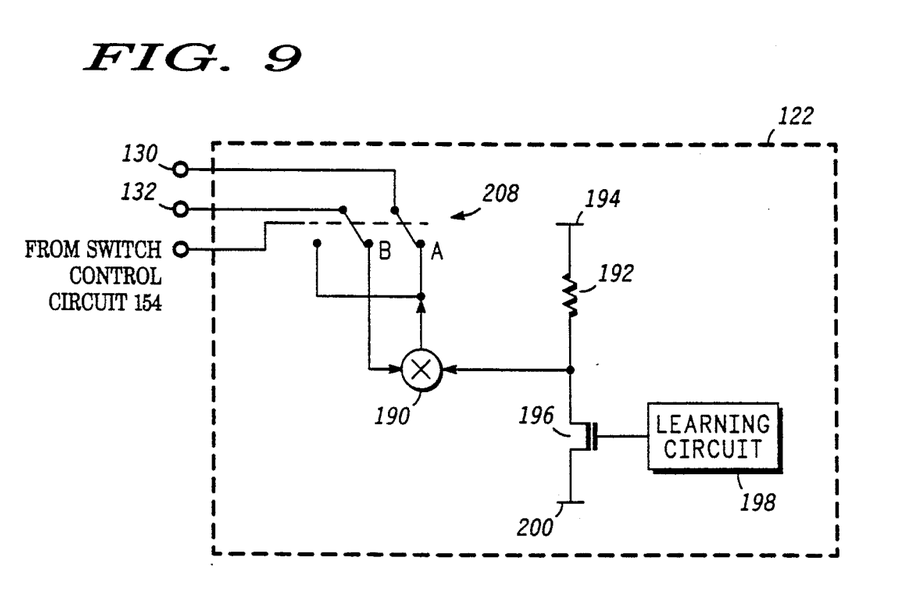
FIG. 9 is a simplified block diagram illustrating an alternate implementation of the bi-directional adaptive synapse.

One of the multipliers, say multiplier 202, may be eliminated as shown in FIG. 9 with the addition of switching circuit 208. Components having a similar function are given the same reference numbers used in FIG. 8. Conductor 130 is coupled through switching circuit 208 to either the output of multiplier 190 that is terminal A, or to the first input of multiplier 190 that is terminal B in response to the first switch control signal provided by switch control circuit 154. Likewise, conductor 132 is coupled to either terminal A of switching circuit 208, or to terminal B of the same in response to the first switch control signal. Again, the weight of synapse 122 developed at the drain of transistor 196 is applied to the second input of multiplier 190. Thus, for the first state of the first switch control signal when switchable driver circuit 74 is driving conductor 130, the latter is connected to terminal B of switching circuit 208 while the output of multiplier 190 is connect to conductor 132 for forward signal transformation. Alternately, for the second state of the first switch control signal when switchable driver circuit 80 is driving conductor 132, the latter is connected to terminal B of switching circuit 208 while the output of multiplier 190 is connect to conductor 130 for providing the reverse signal transformation.

Hence, what has been provided is a novel neural network including a matrix of synapses allowing bi-directional transmission by alternately sending and receiving signal vectors with switchable driver circuits. Furthermore, sample and hold circuits are coupled to the switchable driver circuits for latching the output signals thereof back to the inputs of the same for providing repeated forward and reverse transformations and an improved estimate of the input signal and corresponding output transformation.

We claim:

1. A network having a first plurality of inputs coupled for receiving a spatial vector of an input signal for providing a transformation thereof at a first plurality of outputs, comprising:

first and second plurality of conductors;
a plurality of weighting elements interconnected between said first plurality of conductors and said second plurality of conductors in a predetermined manner;
a first plurality of switchable driver circuits respectively coupled between the first plurality of inputs and said first plurality of conductors, said first plurality of switchable driver circuits operating to drive said first plurality of conductors at the occurrence of a first state of a first switch control signal while receiving signals from said first plurality of conductors at the occurrence of a second state of said first switch control signal, said first plurality of switchable driver circuits including first, second and third terminals, said first terminal being coupled to one of the first plurality of inputs, said second terminal being coupled to one of said first plurality of conductors, said third terminal providing one of a first plurality of output signals;
a second plurality of switchable driver circuits respectively coupled between the first plurality of outputs and said second plurality of conductors, said second plurality of switchable driver circuits operating to receive signals from said second plurality of conductors at the occurrence of a first state of a second switch control signal while driving said second plurality of conductors at the occurrence of a second state of said second switch control signal; and
a switch control circuit coupled to said first and second plurality of switchable driver circuits for providing said first and second switch control signals to control the driving direction thereof.

2. The network of claim 1 wherein each of said second plurality of switchable driver circuits include first, second and third terminals, said first terminal being coupled to one of the first plurality of outputs, said second terminal being coupled to one of said second plurality of conductors, said third terminal providing one of a second plurality of output signals.

3. The network of claim 2 further including:
a second plurality of outputs; and
first means coupled between the first plurality of inputs and said second plurality of outputs and said first and third terminals of said first plurality of switchable driver circuits for sampling and holding said first plurality of output signals provided at said third terminals of said first plurality of switchable driver circuits for application to said first terminals of said first plurality of switchable driver circuits.

4. The network of claim 3 further including:
a second plurality of inputs; and
second means coupled between the first plurality of outputs and said second plurality of inputs and said first and third terminals of said second plurality of switchable driver circuits for sampling and holding said second plurality of output signals provided at said third terminals of said second plurality of switchable driver circuits for application to said first terminals of said second plurality of switchable driver circuits.

5. The network of claim 4 wherein one of said first plurality of switchable driver circuits includes:
an amplifier having first and second inputs and having an output, said first input being coupled to said third terminal of said one of said first plurality of switchable driver circuits;
a first switching circuit having first, second and third terminals and a control input, said first terminal being coupled to said one of said first plurality of inputs, said second terminal being coupled to said one of said first plurality of conductors, said third terminal being coupled to said second input of said amplifier, said control input being coupled for receiving said first switch control signal from said switch control circuit, said first and third terminals being coupled together at the occurrence of said first state of said first switch control signal while said second and third terminals are coupled together at the occurrence of said second state of said first switch control signal; and
a second switching circuit having first and second terminals and a control input coupled for receiving said first switch control signal from said switch control circuit, said first terminal being coupled to said output of said amplifier, said second terminal being coupled to said one of said first plurality of conductors, said first and second terminals being coupled together at the occurrence of said first state of said first switch control signal while said first and second terminals are isolated at the occurrence of said second state of said first switch control signal.

6. The network of claim 4 wherein one of said first plurality of switchable driver circuits includes:
an amplifier having first and second inputs and having an output, said first input being coupled to said third terminal of said one of said first plurality of switchable driver circuits;
a first switching circuit having first, second and third terminals and a control input, said first terminal being coupled to said one of said first plurality of inputs, said second terminal being coupled to said one of said first plurality of conductors, said third terminal being coupled to said second input of said amplifier, said control input being coupled for receiving said first switch control signal from said switch control circuit, said first and third terminals being coupled together at the occurrence of said first state of said first switch control signal while said second and third terminals are coupled together at the occurrence of said second state of said first switch control signal; and
a resistor coupled between said output of said amplifier and said one of said first plurality of conductors.

7. A method of performing bi-directional signal transformations through a network of weighting elements, comprising the steps of:
enabling a first plurality of switchable drive circuits for receiving a first input signal;
driving said first input signal from the outputs of said first plurality of switchable drive circuits in a first direction for transforming said first input signal through the synapses of the network;
enabling a second plurality of switchable drive circuits for receiving said transformed first input signal and providing said first output signal;
switching said second plurality of switchable drive circuits for driving a second input signal in a second direction toward said first plurality of switchable driver circuits for performing a transformation thereof by reversing the drive direction through the weighting elements of the network; and
switching said first plurality of switchable drive circuits for receiving said transformed second input signal and providing a second output signal.

8. A network having a plurality of inputs coupled for receiving a spatial vector of an input signal for providing a transformation thereof at a plurality of outputs, comprising:
a first plurality of conductors;
a second plurality of conductors;
a plurality of weighting elements interconnected between said first plurality of conductors and said second plurality of conductors in a predetermined manner;
first means coupled between the plurality of inputs and said first plurality of conductors for driving signals in either direction in response to a first control signal, said first means driving said first plurality of conductors at the occurrence of a first state of said first control signal while receiving signals from said first plurality of conductors at the occurrence of a second state of said first control signal; and
second means coupled between the plurality of outputs and said second plurality of conductors for driving signals in either direction in response to a second control signal, said second means receiving signals from said second plurality of conductors at the occurrence of said first state of said second control signal while driving said second plurality of conductors at the occurrence of said second state of said second control signal.

9. The network of claim 8 further including third means coupled to said first and second means for providing said first and second control signals for controlling the driving direction thereof.

10. The network of claim 9 wherein said first means includes a switchable driver circuit having first and second terminals, said first terminal being coupled to one of the plurality of inputs, said second terminal being coupled to one of said first plurality of conductors.

11. The network of claim 10 wherein said switchable driver circuits includes:
an amplifier having first and second inputs and having an output, said first input being coupled to said third terminal of said switchable driver circuits;
a first switching circuit having first, second and third terminals and a control input, said first terminal being coupled to said one of said first plurality of inputs, said second terminal being coupled to said one of said first plurality of conductors, said third terminal being coupled to said second input of said amplifier, said control input being coupled for receiving said first control signal from said switch control circuit, said first and third terminals being coupled together at the occurrence of said first state of said first control signal while said second and third terminals are coupled together at the occurrence of said second state of said first control signal; and
a resistor coupled between said output of said amplifier and said one of said first plurality of conductors.

12. A bi-directional neuron responsive to a spatial vector of an input signal for providing a transformation thereof at an output, comprising:
a plurality of weighting elements each having an input and an output;
first means coupled between said outputs of said plurality of weighting elements and the output of the bi-directional neuron in a predetermined manner for combining the spatial vector of the input signals at an output; and
a switching circuit having first, second, third, fourth and fifth terminals and having a control input, said first terminal being coupled for receiving one element of the spatial vector of the input signal, said second terminal being coupled to said input of one of said plurality of weighting elements, said third terminal being coupled to said output of said one of said plurality of weighting elements, said fourth and fifth terminals being coupled together to said output of said first means, said first and second terminals and said third and fifth terminals being coupled together at the occurrence of a first state of a control signal while said first and third terminals and said second and fourth terminals are respectively coupled together at the occurrence of a second state of said control signal.

13. The bi-directional neuron of claim 12 further comprising second means coupled to said control input of said switching circuit for providing said control signal for controlling the signal propagation direction therethrough.

14. A network having a plurality of inputs coupled for receiving a spatial vector of an input signal for providing a transformation thereof at a plurality of outputs, comprising:

a first plurality of conductors;

a second plurality of conductors;

a plurality of weighting elements interconnected between said first plurality of conductors and said second plurality of conductors in a predetermined manner;

first means coupled between the plurality of inputs and said first plurality of conductors for driving signals in either direction in response to a control signal, said first means comprising a switchable driver circuit including, (a) first, second and third terminals, said first terminal being coupled to one of the first plurality of inputs, said second terminal being coupled to one of said first plurality of conductors, (b) an amplifier having first and second inputs and having an output, said first input being coupled to said third terminal of said switchable driver circuit, (c) a first switching circuit having first, second and third terminals and a control input, said first terminal being coupled to said one of said first plurality of inputs, said second terminal being coupled to said one of said first plurality of conductors, said third terminal being coupled to said second input of said amplifier, said control input being coupled for receiving said control signal, said first and third terminals being coupled together at the occurrence of said first state of said first control signal while said second and third terminals are coupled together at the occurrence of said second state of said control signal, and (d) a resistor coupled between said output of said amplifier and said one of said first plurality of conductors; and second means coupled between the plurality of outputs and said second plurality of conductors for driving signals in either direction in response to a second control signal.

* * * * *